United States Patent [19]

Kuwabara

[11] 4,253,794
[45] Mar. 3, 1981

[54] METHOD OF CONTROLLING WICKET GATES OF A PUMP-TURBINE

[75] Inventor: Takao Kuwabara, Hitachi, Japan
[73] Assignee: Hitachi, Ltd., Tokyo, Japan
[21] Appl. No.: 940,359
[22] Filed: Sep. 7, 1978
[30] Foreign Application Priority Data Jul. 26, 1978 [JP] Japan .............................. 52/107447

[51] Int. Cl.³ .......................................... F03B 15/02
[52] U.S. Cl. .......................................... 415/1; 415/36
[58] Field of Search .................................. 415/1, 36

[56] References Cited

U.S. PATENT DOCUMENTS

| 3,275,293 | 9/1966 | Hosogai et al. | 415/1 |
| 3,339,567 | 9/1967 | Fukasu et al. | 415/1 |
| 3,403,888 | 10/1968 | Hartland | 415/1 |

FOREIGN PATENT DOCUMENTS

| 1503261 | 5/1970 | Fed. Rep. of Germany | 415/1 |
| 2713867 | 10/1977 | Fed. Rep. of Germany | 415/1 |

Primary Examiner—Everette A. Powell, Jr.
Attorney, Agent, or Firm—Thomas E. Beall, Jr.

[57] ABSTRACT

A method of controlling the wicket gates of a pump-turbine having in the turbine operation area S-section where discharge per unit head and torque per unit head reduce with the reduction of speed per unit head. The pump-turbine is incorporated in a hydraulic system together with at least one of other pump-turbines. A penstock includes a plurality of pipelines each extending from the upstream side of each of the pump-turbines, while a tailrace includes a plurality of pipelines each extending from the downstream side of each of the pump-turbines; and at least one of the upstream ends of the pipelines of the penstock and the downstream ends of the pipelines of the tailrace are connected to a common pipeline. Upon sudden removal of load from the pump-turbine having the S-section, the wicket gates are closed at an earlier timing so that the hydraulic pressure in the penstock may reach the maximum value before the pump-turbine initiates to operate in the S-section.

6 Claims, 7 Drawing Figures

FIG. IA
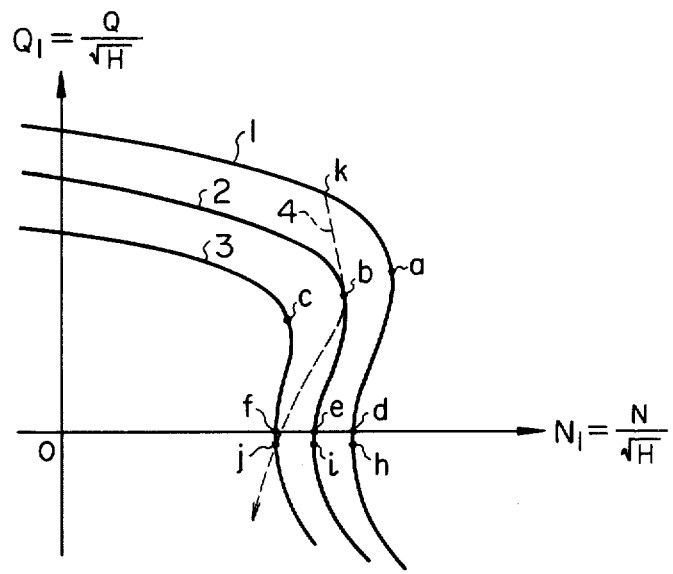
FIG. IB
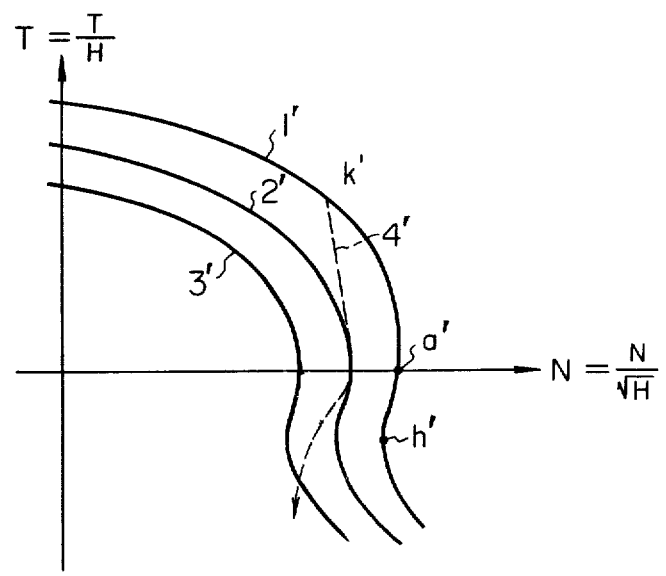

METHOD OF CONTROLLING WICKET GATES OF A PUMP-TURBINE

BACKGROUND OF THE INVENTION

1. Field of the Invention

The present invention relates to a hydraulic system and more particularly to a method of controlling the wicket gates of a pump-turbine incorporated in the hydraulic system.

Generally, various components such as runner of a pump-turbine, particularly of a high-head type, are designed to achieve sufficient centrifugal pump action so as to obtain the high-head during pump operation. However, this design badly affects the turbine operation of the pump-turbine. When the performance of the pump-turbine designed in this manner is shown by the performance curve representing the relationship between speed per unit head $N_1$ and discharge per unit head $Q_1$ under a predetermined opening degree of wicket gates, this curve includes in the turbine operation area a first section where the value of $Q_1$ reduces with the increase of the value of $N_1$ and a second section where the value of $Q_1$ reduces with the decrease of the value of $N_1$. In this specification, the second section will be referred to as "S-section" for convenience of explanation. Further, the pump-turbine performance in the S-section will be hereinafter referred to as "S-performance." During the turbine operation in the S-section, the value of torque per unit head $T_1$ also is reduced as the value of speed per unit head $N_1$ decreases, while in the first section value of $T_1$ reduces as the value of $N_1$ increases.

Ordinarily, the turbine operation of the pump-turbine is effected in the abovementioned first section. However, in the case where the speed per unit head $N_1$ is suddenly increased because of for example a removal or loss of load carried on the pump-turbine, the pump-turbine initiates to operate in the S-section. When the operation in the S-section is initiated, the discharge per unit head $Q_1$ and speed per unit head $N_1$ are first reduced tracing the S-section from one end to the other, and thereafter $Q_1$ and $N_1$ are increased tracing the S-section in the opposite direction. This reciprocal tracing on the S-section is repeated endlessly and would never be terminated without taking particular measures. Also the torque per unit head $T_1$ is repeatedly reduced and increased during this pump-turbine operation. The pump-turbine operation in the S-section causes in the penstock and tailrace as well as in the pump-turbine a disadvantageous abnormal hydraulic pressure variation inclusive of large pressure rise and drop with the resultant severe water hammer and, in an extreme case, water column separation. It is to be noted that the abovementioned removal of load would occur, if for example the pump-turbine were driving a generator which lost its load due to the failure or burning out of a transformer, and that the water hammer is very severe when the penstock or tailrace, or both, is long.

There is the case where a plurality of turbine operation means such as turbines and/or pump-turbines are incorporated in the hydraulic system, and a plurality of hydraulic pipelines each extending across each of the turbine operation means are joined at their upstream ends to an upstream common pipeline connected to an upper reservoir and/or at their downstream ends to a downstream common pipeline connected to a lower reservoir. In this case, the hydraulic system is designed to comprise a plurality of turbine operation means, penstock means including a plurality of pipelines each extending from the upstream side of each of the turbine operation means and communicated with the upper reservoir, and tailrace means including a plurality of pipelines each extending from the downstream side of each of the turbine operation means and communicated with the lower reservoir, at least one of the upstream ends of the pipelines of the penstock means and the downstream ends of the pipelines of the tailrace means being connected through a multi-branched manifold to a common pipeline which in turn is connected to the corresponding reservoir. When the hydraulic system is designed in this manner, the operation of one of the turbine operation means affects the operation of the other turbine operation means. If the plurality of turbine operation means do not include the pump-turbine having the abovementioned S-performance, the most severe condition causing the maximum hydraulic pressure in the penstock means as well as the minimum hydraulic pressure in the tailrace means occurs when the plurality of turbine operation means have lost their loads simultaneously. It is here assumed that the plurality of turbine operation means are arranged substantially symmetrically such that the pipelines of the penstock means and/or pipelines of the tailrace means which are connected to the common pipeline have substantially the same lengths. It will be understood that, when the plurality of turbine operation means do not include the pump-turbine having the S-performance, the entire hydraulic system can be designed under consideration of the most severe condition described above.

If however the plurality of turbine operation means include one or a plurality of pump-turbine or pump-turbines having the S-performance, there is a possibility that the disadvantageous pressure variation caused during the pump-turbine operation in the S-section is accelerated due to the operation of the other turbine operation means. The pump-turbine operation thus affected by the other turbine operation means further affects the operation of the latter turbine operation means. The disadvantageous pressure variation is unexpectedly uncontrollably multiplied in this manner. If such multiplication effect occurs, the simultaneous removal of loads from the turbine operation means does not always cause the most severe condition. For example, when the plurality of turbine operation means have lost their loads successively with certain time lags, the hydraulic pressure rise in the penstock means and the hydraulic pressure drop in the tailrace means may become extremely severe because of the multiplication effect described above. It cannot be easily analyzed under what operational conditions of the respective turbine operation means the most severe condition occurs, and there are cases where the hydraulic pressure variation caused under the most severe condition is extremely larger than the pressure variation caused when the plurality of turbine operation means have lost their loads simultaneously. Further, the extremely larger pressure drop caused in the tailrace means under the most severe condition occasionally causes the water column separation in the tailrace means. If the entire hydraulic system were designed to withstand such larger pressure variation, it would become extremely uneconomical.

As will be understood from the foregoing, when the turbine operation means include the pump-turbine or pump-turbines having the S-performance, and the values of the maximum pressure in the penstock means and the minimum pressure in the tailrace means are determined as being subjected to the multiplication effect during the pump-turbine operation in the S-section, it is difficult to control such maximum and minimum pressures.

2. Description of the Prior Arts

There have been proposed various wicket gate controlling methods intending to reduce the disadvantageous hydraulic pressure variation by controlling the closure of the wicket gates upon sudden removal of load from the pump-turbine. However, these methods cannot prevent the abovementioned multiplied hydraulic pressure variation caused while the pump-turbine is being operated in the S-section as being affected by the operation of the other pump-turbine or turbine. It is considered that the prior art methods have been proposed without sufficiently analyzing and understanding the S-performance of the pump-turbine.

SUMMARY OF THE INVENTION

It is therefore an object of the present invention to provide a method of controlling the wicket gates of a pump-turbine of the type having the S-performance, which can prevent the above-discussed unexpectedly multiplied hydraulic pressure variation caused during the pump-turbine operation in the S-section.

It is another object of the invention to make the maximum pressure value in the penstock means as well as the minimum pressure value in the tailrace means controllable.

The method of the present invention is applied to a hydraulic system which comprises an upper and a lower reservoirs, a plurality of turbine operation means, penstock means including a plurality of pipelines each extending from the upstream side of each of the turbine operation means and communicated with the upper reservoir, and tailrace means including a plurality of pipelines each extending from the downstream side of each of the turbine operation means and communicated with the lower reservoir, at least one of the upstream ends of the pipelines of the penstock means and the downstream ends of the pipelines of the tailrace means being connected through a multi-branched manifold to a common pipeline which in turn is connected to the corresponding reservoir, at least one of the turbine operation means including a pump-turbine which has in the turbine operation area thereof S-section where discharge per unit head $Q_1$ and torque per unit head $T_1$ reduce with the reduction of speed per unit head $N_1$. In accordance with one aspect of the invention, the method of controlling wicket gates of the pump-turbine used in the abovementioned hydraulic system comprises the step of closing the wicket gates at an earlier timing upon load rejection or decrease so that the hydraulic pressure in the penstock means may reach the maximum value before the pump-turbine initiates to operate in the S-section.

The foregoing objects and other objects as well as the characteristic features of the invention will become more apparent by the following description when read in conjunction with the accompanying drawings.

BRIEF DESCRIPTION OF THE INVENTION

FIGS. 1A and 1B graphically illustrate the performance of a pump-turbine of the type which exhibits the S-performance during turbine operation;

FIGS. 2A to 2D schematically illustrate the prior art methods of controlling the wicket gates of the pump-turbine upon sudden removal of load from the latter; and FIG. 3 graphically illustrates the hydraulic pressure variations in a penstock and a tailrace which are caused by adopting a wicket gate controlling method of a prior art.

DETAILED DESCRIPTION OF THE INVENTION

Figure 2A:
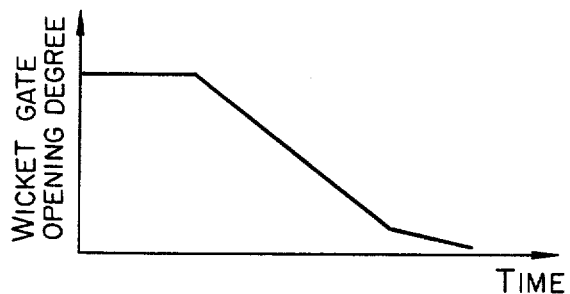

Before entering into detailed discussion of the invention, the pump-turbine performance and the prior art wicket gate controlling methods will be described.

The performance of a pump-turbine exhibiting S-performance during the turbine operation is illustrated in FIGS. 1A and 1B. FIG. 1A illustrates the pump-turbine performance as the relationship between speed per unit head $N_1$ and discharge per unit head $Q_1$ with the wicket gate opening degree used as a parameter, while FIG. 1B illustrates the performance as the relationship between the speed per unit head $N_1$ and torque per unit head $T_1$ utilizing the same parameter. $N_1$, $Q_1$ and $T_1$ are represented by the following equations:

$N_1 = N/\sqrt{H}$, $Q_1 = Q/\sqrt{H}$, and $T_1 = T/H$.

In these equations, characters N, Q, H and T designate number of rotation of the pump-turbine, hydraulic flow rate through the pump-turbine, the pump-turbine effective head and the pump-turbine torque, respectively.

Performance curves 1 and 1' are obtained with a predetermined large opening degree of wicket gates, and performance curves 2 and 2' are obtained by making the wicket gate opening degree smaller. Further, performance curves 3 and 3' represent the pump-turbine performance obtained with further reduced wicket gate opening degree. On the section a-d-h of the performance curve 1, the value of $Q_1$ is reduced with the decrease of the value of $N_1$. This curve section a-d-h is referred in this specification to "S-section". Similarly, the curve sections b-e-i and c-f-j also are S-section of the performance curves 2 and 3, respectively. As can be seen, the S-section a-d-h of the performance curve 1 is larger in length than the S-section b-e-i of the performance curve 2, and the S-section b-e-i of the performance curve 2 has a larger length than the S-section c-f-j of the performance curve 3. This means that the length of the S-section is reduced when the opening of the wicket gates is reduced.

Next, the turbine operation of the pump-turbine will be described under assumption that the pump-turbine performance is represented by the performance curves 1 and 1'. As can be understood, this performance is obtained by selecting the opening degree of the wicket gates to the predetermined large value. Ordinarily, the turbine operation of the pump-turbine is effected on the upper curve section of the performance curve 1, i.e., on the curve section above the S-section a-d-h, in which the value of $Q_1$ reduces with the increase of the value of $N_1$. However, if for example the load carried on the pump-turbine is suddenly removed, the value of $N_1$ is suddenly largely increased because of the sudden increase of the pump-turbine rotation N. Thus, the pump-turbine initiates to operate in the S-section. During the operation in the S-section, when the value of $N_1$ is reduced due to the decrease of the pump-turbine rotation N, the value of $Q_1$ also is reduced. The reduction of the value of $Q_1$ indicates that the flow rate Q through the pump-turbine is correspondingly reduced, provided that the value of H is constant. Actually, the value of H, which is represented by the difference in head between the inlet side of the pump-turbine connected to a penstock and the outlet side thereof connected to a tailrace, is increased as the flow rate Q reduces. Thus, once the value of $N_1$ is reduced, the flow rate Q is reduced, and the reduction of the flow rate Q causes the increase of pump-turbine effective head H. This increase in the effective head H further decreases the value of $N_1$, which in turn causes further decrease of $Q_1$. Thus, once the operation in the S-section is initiated, $Q_1$ and $N_1$ are acceleratingly continuously reduced tracing the S-section in the $Q_1$-reducing direction, i.e., from the point a to point h. It will be understood that $Q_1$ and $N_1$ are acceleratingly continuously reduced in the same manner as a positive feed-back control circuit.

After the trace on the S-section from the point a to the point h has been ended, the above phenomenon similar to the positive feed-back control circuit is gradually decelerated, and thereafter the trace on the S-section is reversed in the $Q_1$-increasing direction, i.e., from the point h to point a. The trace in this direction also is effected in the same manner as the positive feed-back control circuit.

The above-discussed reciprocal tracing is endlessly continuously repeated during the pump-turbine operation in the S-section. As previously explained, this operation is undesirable since it causes an abnormal hydraulic pressure variation in the hydraulic system accompanying a severe water hammer and, occasionally, a water column separation. It is to be noted that the adverse effects caused during the pump-turbine operation in the S-section is reduced when the length of the S-section is reduced. For example, if the wicket gate opening degree is reduced to obtain the performance curve 2 having the S-section b-e-i of the reduced length, the adverse effects are reduced.

The pump-turbine operation in the S-section badly affects the pump-turbine torque T also. When the value of $N_1$ is reduced in the S-section, the value of $T_1$ is reduced as shown in FIG. 1B. It is to be noted here that the points a and h of the performance curve 1 shown in FIG. 1A correspond to the points a' and h' of the performance curve 1' in FIG. 1B. The reduction of the value of $T_1$ means that the pump-turbine torque T is reduced, provided that the pump-turbine effective head H is constant. Further, it is apparent that the reduction in the pump-turbine torque T causes the reduction in the pump-turbine rotation N. When the pump-turbine rotation N is reduced, the value of $N_1$ will be correspondingly reduced, which in turn causes the further reduction of $T_1$. Thus, while the S-section of the performance curve 1 is traced in the $Q_1$-reducing direction, the performance curve 1' is traced from the point a' to point h' in the same manner as the positive feed-back control circuit. Further, when the tracing direction on the S-section is reversed, the performance curve 1' is traced from the point h' to point a'. Apparently, the abovementioned torque variation is disadvantageous.

FIGS. 2A to 2D are schematic views showing the prior art methods of controlling the wicket gates upon removal of load from the pump-turbine. In these figures, the prior art methods are schematically illustrated as relationships between the wicket gate opening degree and the time lapse after the load is removed.

The wicket gates are ordinarily controlled by a governor in the pump-turbine to close upon removal of load. The method of FIG. 2A which is disclosed in U.S. Pat. No. 3,452,962 is directed to prevent the governor from closing the wicket gates for a predetermined time period after the load has been removed. More particularly, the wicket gates are maintained to have a constant opening degree for the predetermined time and thereafter rapidly closed. In the method of FIG. 2A, the wicket gates are prevented from being closed while the pump-turbine rotation is being increased after the load has been removed with a view to preventing that the flow rate through the pump-turbine is further reduced due to the closure of the wicket gates. Although this method is applicable to pump-turbines of an ordinary performance that the flow rate through the pump-turbine always decreases with the increase of the pump-turbine rotation, it would not be applicable to the pump-turbines having S-performance.

The pump-turbine operation tracing the S-section is not initiated until the speed per unit head $N_1$ is increased to reach the point a in FIG. 1A, even when the load has been removed. Thus, the operation in the S-section is initiated after lapse of a predetermined time period from the removal of load. It is preferable that the wicket gates are closed during the latter time period in contrast with the method of FIG. 2A, since the pump-turbine performance may be transferred by this closure to reduce the adverse effects caused in the S-section. For example, the performance which had been represented by the performance curve 1 in FIG. 1A may be transferred by the closure of the wicket gates to the performance represented by the performance curve 2, so that the adverse effects in question can be reduced by this transfer. The method of FIG. 2A is not preferable from this standpoint. It is further to be noted that the rapid closure of the wicket gates should not be made when the pump-turbine operation is effected tracing the S-section in the $Q_1$-reducing direction, so as to prevent that the tracing is accelerated because of the reduction of for example $Q_1$ and $N_1$ caused by this rapid closure. The method of FIG. 2A is dangerous since the timing of effecting the rapid closure of the wicket gates is determined independently of the S-performance. The method of FIG. 2A rather suggests that the rapid closure is to be started immediately when the increase of the pump-turbine rotation is terminated and the decrease of the latter is initiated, i.e., immediately when the pump-turbine operation tracing the S-section is initiated. If the rapid closure is effected while the S-section is being traced in the $Q_1$-reducing direction, the adverse effects at the S-section will be largely dangerously accelerated.

Besides, the opportunity that the rapid closure is effected during the pump-turbine operation tracing the S-section in the $Q_1$-reducing direction is not limited to a predetermined time period after the removal of load, but occurs repeatedly. This every opportunity should be avoided to prevent the disadvantageous abnormal hydraulic pressure variation.

Figure 2B:
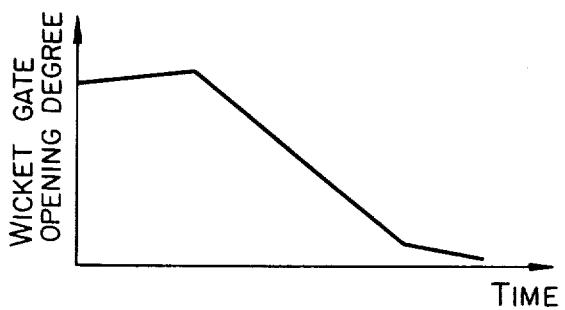

In the method of FIG. 2B, the wicket gates are first slowly opened and thereafter rapidly closed. This method intends to open the wicket gates while the pump-turbine rotation is being increased, with a view to offsetting the reduction of the pump-turbine flow rate by the increased flow rate due to the opening of the wicket gates. This method has the similar defects to the method of FIG. 2A. Particularly, the method of FIG. 2B is defective in that the timing of effecting the rapid closure of the wicket gates is determined without giving consideration to the S-performance.

Figure 2C:
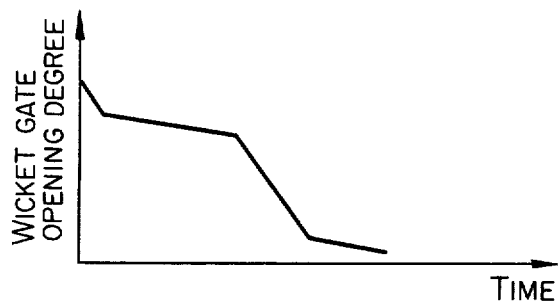

The method of FIG. 2C is desclosed in Japanese Patent Publication No. 40902/74. In this method, the wicket gates are first rapidly closed upon sudden removal of load, in turn slowly closed in the turbine operation area where hydraulic flow rate through the pump-turbine is largerly reduced with the increase of the pump-turbine rotation and in turn rapidly closed. This method also is defective in that the dangerous tracing on the S-section in the $Q_1$-reducing direction does not occur while the pump-turbine rotation is increasing.

Figure 2D:
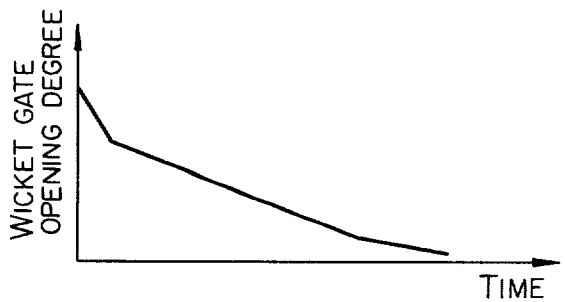

In the method of FIG. 2D, the wicket gates are first rapidly closed, and, when the hydraulic pressure variation is increased to a certain value, they are slowly closed so as to prevent that the pressure variation is further increased. This method is defective in that the timing of effecting the slow closure is determined independently of the pump-turbine operation in the S-section. This method is defective also in that the time period required for completing the closure of the wicket gates is very long because of the continuous application of the slow closure.

As described above, the prior art methods have the common defect that the timing of effecting the closure of wicket gates is not determined under careful consideration of the S-performance. In order to avoid the disadvantageous abnormal pressure variation, it is necessary to control the wicket gates such that the rapid closure thereof is not effected while the pump-turbine operates tracing the S-section in the $Q_1$-reducing direction. Also it will be understood that wicket gates should not be opened while the S-section is traced in the $Q_1$-increasing direction.

Figure 3:
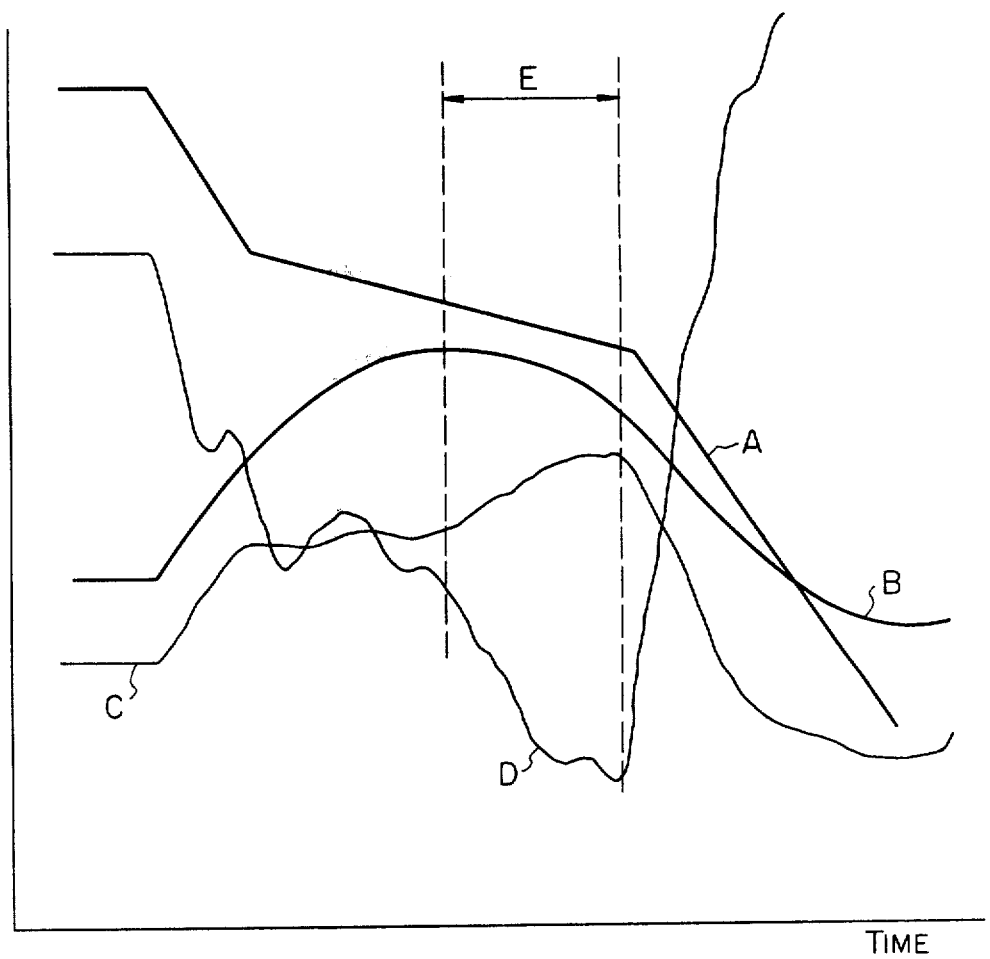

FIG. 3 illustrates hydraulic pressure variation caused in a hydraulic system when one of the prior art wicket gates controlling methods is adopted. In the FIG. 3 gragh, lines A to D represent wicket gates opening degree, pump-turbine rotation, hydraulic pressure in the penstock and hydraulic pressure in the tailrace, respectively. The abscissa of this graph shows the time lapse after the removal of load from the pump-turbine. As can be seen, in the illustrated prior art method, the hydraulic pressure in the penstock reaches a maximum value after the maximum pump-turbine rotation is attained, and that this maximum value of the penstock pressure is produced while the S-section is being traced in the $Q_1$-reducing direction or at the time when the tracing on the S-section in this direction is terminated. Similarly, the hydraulic pressure in the tailrace reaches a minimum value after the maximum pump-turbine rotation is attained, and that this minimum value of the tailrace pressure is produced while the S-section is being traced in the $Q_1$-reducing direction or at the time when the tracing on the S-section in this direction is terminated. It should be noted here that character E designates the area where the tracing on the S-section in the $Q_1$-reducing direction is effected.

As previously described, in the case where the hydraulic system comprises a plurality of turbine operation means, penstock means including a plurality of pipelines each extending from the upstream side of each of the turbine operation means and communicated with the upper reservoir, and tailrace means including a plurality of pipelines each extending from the downstream side of each of the turbine operation means and communicated with the lower reservoir, and at least one of the upstream ends of the pipelines of the penstock means and the downstream ends of the pipelines of the tailrace means are connected through a multibranched manifold to a common pipeline which in turn is connected to the corresponding reservoir, the operation of one of the turbine operation means affects the operation of the other turbine operation means. If at least one of the turbine operation means is composed of the pump-turbine having the S-performance and the maximum pressure in the penstock means as well as the minimum pressure in the tailrace means occur while the pump-turbine operation in the S-section is being effected, the pressure rise and drop would become very severe and uncontrollable because of the multiplication effect described hereinbefore.

The inventor of the present invention conceived the method of controlling the wicket gates of the pump-turbine upon removal or loss of load which can avoid the unexpected larger pressure rise and drop caused by the multiplication effect. Primarily, this method comprises the step of closing the wicket gates at an earlier timing so that the hydraulic pressure in the penstock means may reach the maximum value before the pump-turbine initiates to operate in the S-section. With this method, the hydraulic pressure rise in the penstock means caused during the initial closure of the wicket gates is controlled by the speed of the closure motion to become larger than the hydraulic pressure rise caused during the subsequent pump-turbine operation in the S-section. Since the maximum hydraulic pressure rise caused during the whole pump-turbine operation is determined by the speed of the closure motion of the wicket gates, it would become possible to control this pressure rise. It will thus be understood that, if the method of the invention is adopted, the most severe condition which causes the largest pressure variation occurs when the plurality of turbine operation means have lost their loads simultaneously.

It is preferable that the wicket gates are closed as rapidly as possible before the pump-turbine operation in the S-section is initiated so as to reduce the abnormal hydraulic pressure variation caused during the subsequent pump-turbine operation tracing the S-section. As shown by a dotted line 4 in FIG. 1A, when the rapid closure of the wicket gates is effected at a point k before the S-section of the curve 1, the pump-turbine performance which had been represented by for example the curve 1 is transferred along the dotted line section k-b to for example the performance curve 2 which has the S-section of smaller length than the S-section of the curve 1.

If the opening degree of the wicket gates is maintained constant after the rapid closure from the point k to the point b has been terminated, the pump-turbine operation tracing the S-section of the curve 2 is effected thereafter. On the other hand, if the wicket gates are slowly closed from the point b, disadvantageous hydraulic pressure variation would be a little increased as compared with the case where the S-section of the curve 2 were traced. In both cases, the disadvantages brought about during the pump-turbine operation after the point b are not serious if the wicket gates are closed at the earlier timing to cause the maximum hydraulic pressure in the penstock means before the initiation of the pump-turbine operation in the S-section.

It is to be noted that a dotted line 4' in FIG. 1B corresponds to the dotted line 4 of FIG. 1A.

As will be understood from FIGS. 1A and 1B, in the case where the S-section is traced in the $Q_1$-reducing direction, the relationship, $dN_1/dt < 0$ and $dT_1/dt < 0$, are satisfied. The formulae, $dN_1/dt < 0$ and $DT_1/dt < 0$, may be replaced by $dN/dt<0$ and $dT/dt<0$, respectively, assuming that H is constant. As is well-known, the torque T may be designated by the equation, $I \cdot dN/dt = kT$, wherein I and k indicate moment of inertia and positive constant number, respectively. To differentiate by time t the left and right terms of the above equation, the equation, $d^2N/dt^2 = k'dT/dt$ is obtained, wherein k' indicates positive constant number. Thus, the relationship, $dT_1/dt<0$, can be rewritten into the relationship, $d^2N/dt^2<0$, which indicates that the variation curve of N is convex toward the upside (Refer to curves B in FIG. 3.). It will thus be understood that, when the S-section is traced in the $Q_1$-reducing, i.e., $N_1$ or N-reducing direction, both of the relationships, $dN/dt<0$ and $d^2N/dt^2<0$, are satisfied (Refer to E in FIG. 3.).

As best shown in FIG. 3, the pump-turbine operation tracing the S-section is initiated approximately at the maximum pump-turbine rotation (As will be understood from FIG. 1B, the pump-turbine operation in the S-section is initiated approximately at the point where pump-turbine torque T equals zero. This point correspond to the point where the increase of pump-turbine rotation is terminated and the reduction of the latter is initiated.). Thus, the abovementioned wicket gate closure step, which is effected before the initiation of the pump-turbine operation tracing the S-section, should be carried out before the pump-turbine rotation reaches the maximum value.

During the pump-turbine operation tracing the S-section in the $Q_1$-increasing direction, it is desirable that the wicket gates are prevented from being opened, so as to prevent that the tracing on the S-section in this direction is accelerated. Preferably, the wicket gates are closed when the tracing on the S-section in the $Q_1$-reducing direction is terminated or when the trace on the same section in the $Q_1$-increasing direction is initiated; i.e. when the pump-turbine escaped the operation on the S-section in the $Q_1$-reducing direction. This closure of the wicket gates should preferably be effected as rapidly as possible under condition that the hydraulic pressure variation caused by this rapid closure of the wicket gates does not exceed the value of pressure variation caused during the first rapid closure step which is carried out before the pump-turbine operation tracing the S-section is initiated.

As will be understood from the foregoing, the method of controlling the wicket gates of the pump-turbine according to the invention can prevent unexpectedly abnormal hydraulic pressure variation due to the multiplication effect caused during the pump-turbine operation in the S-section. Thus, this method assures an economical design and a security of the entire hydraulic system.

What is claimed is:

1. In a hydraulic system comprising an upper and a lower reservoirs, a plurality of turbine operation means, penstock means including a plurality of pipelines each extending from the upstream side of each of said turbine operation means and communicated with said upper reservoir, and tailrace means including a plurality of pipelines each extending from the downstream side of each of said turbine operation means and communicated with said lower reservoir, at least one of the upstream ends of the pipelines of said penstock means and the downstream ends of the pipelines of said tailrace means being connected through a multi-branched manifold to a common pipeline which in turn is connected to the corresponding reservoir, at least two of said turbine operation means including a pump-turbine with wicket gates closable and openable to control the flow of fluid through the turbine and which has S-section performance in the turbine operation area, said S-section performance being defined on an $N_1$ versus $Q_1$ performance curve drawn with a parameter of opening degree of wicket gates as that where $dQ_1/dN_1>0$ is satisfied along said performance curve, where $Q_1$ is the discharge through said pump-turbine per unit head and $N_1$ is the rotating speed of said pump-turbine per unit head, a method of controlling wicket gates of each of said pump-turbines to reduce abnormal pressure rises in the system upon sudden reduction or removal of load which comprises the steps of:

detecting the sudden reduction or removal of load from the turbine;

in response to said detecting, closing the wicket gates down to an opening degree where said S-section is smaller in length but still exists on the corresponding $Q_1$ versus $N_1$ performance curve, for the short period while the operation point of said pump-turbine on said $N_1$ versus $Q_1$ performance curve approaches to but still remains out of said S-section; and controlling the pattern of said closing so that the resultant pressure rise in said penstock means is larger than any pressure rises in said penstock means that arise thereafter during the subsequent transient state through said S-section.

2. A controlling method as set forth in claim 1, wherein said wicket gates are rapidly closed during said wicket gates closing step.

3. A controlling method as set forth in claim 2, further comprising the steps of gradually closing said wicket gates after said pump-turbine initiates to operate in said S-section.

4. A controlling method as set forth in claim 2, further comprising the steps of gradually closing said wicket gates after said pump-turbine initiates to operate in said S-section, and rapidly closing said wicket gates when said pump-turbine escaped the operation in said S-section.

5. A controlling method as set forth in claim 2, further comprising the steps of holding the opening degree of said wicket gates after said pump-turbine initiates to operate in said S-section, and rapidly closing said wicket gates when said pump-turbine escaped the operation in said S-section.

6. A controlling method as set forth in claim 1, 2, 3, 4 or 5, wherein the first-mentioned wicket gates closing step is carried out to cause the maximum hydraulic pressure in said penstock means before the pump-turbine rotation reaches the maximum value.

* * * * *